US012700162B1

(12) United States Patent
Crowley

(10) Patent No.: US 12,700,162 B1
(45) Date of Patent: Aug. 4, 2026

(54) SYSTEMS AND METHODS FOR CREATING INTERACTIVE AI HUMAN AVATARS FROM MULTIMODAL DATA FOR LEGACY PRESERVATION, TRAINING, AND ENTERTAINMENT

(71) Applicant: Jacob Crowley, Clearwater, FL (US)

(72) Inventor: Jacob Crowley, Clearwater, FL (US)

(73) Assignee: MyAKH Inc, Clearwater, FL (US)

( * ) Notice: Subject to any disclaimer, the term of this patent is extended or adjusted under 35 U.S.C. 154(b) by 0 days.

(21) Appl. No.: 19/333,759

(22) Filed: Sep. 19, 2025

(51) Int. Cl.
| | |
|---|---|
| *G06T 13/40* | (2011.01) |
| *G06Q 20/12* | (2012.01) |
| *G06T 13/20* | (2011.01) |
| *G10L 13/00* | (2006.01) |
| *G10L 19/00* | (2013.01) |
| *G10L 25/63* | (2013.01) |

(52) U.S. Cl.
CPC ......... *G06T 13/40* (2013.01); *G06Q 20/1235* (2013.01); *G06T 13/205* (2013.01); *G10L 13/00* (2013.01); *G10L 19/0018* (2013.01); *G10L 25/63* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 12,367,638 | B1 * | 7/2025 | Dehkordi | ................ G06T 15/00 |
| 12,489,633 | B1 * | 12/2025 | Arkoff | .................. H04L 9/3213 |

| | | | | |
|---|---|---|---|---|
| 2007/0150612 | A1 * | 6/2007 | Chaney | .............. H04L 65/4015 |
| | | | | 709/231 |
| 2015/0213195 | A1 * | 7/2015 | Blechman | .............. G16H 10/60 |
| | | | | 705/51 |
| 2022/0255931 | A1 * | 8/2022 | Avetisov | ............... H04L 9/3247 |
| 2022/0300618 | A1 * | 9/2022 | Ding | ........................ G06N 5/01 |
| 2024/0169635 | A1 * | 5/2024 | Singh | ..................... G06V 10/82 |
| 2024/0331445 | A1 * | 10/2024 | Sekar | ................. G06V 10/7715 |
| 2025/0209326 | A1 * | 6/2025 | Madisetti | ............... G06N 3/045 |
| 2025/0217700 | A1 * | 7/2025 | Hsieh | ..................... G10L 21/10 |

(Continued)

FOREIGN PATENT DOCUMENTS

WO    WO-2013013281 A1 *   1/2013   ........... A63F 13/213

*Primary Examiner* — Sarah Le

(57) ABSTRACT

A system and method for generating interactive artificial intelligence (AI) avatars of real individuals using multimodal data. The invention includes a Data Ingestion Module that collects and processes user-specific data including photos, videos, audio recordings, written materials, and behavioral profiling. A Personality Modeling Engine uses this data to generate a dynamic personality model representing the individual's communication style, emotional tendencies, and decision-making behavior. A Voice & Likeness Synthesis Unit produces a voice model and photorealistic digital likeness, while an Interaction Module enables real-time communication with users through text, voice, video, or immersive environments. A Licensing & Usage Management System tracks avatar deployment and monetization, and a Rendering Engine animates the avatar in real time based on sentiment and contextual cues. The system enables applications in legacy preservation, education, entertainment, and commercial engagement while supporting privacy-first deployment and ethical licensing of digital likenesses.

20 Claims, 4 Drawing Sheets

(56) References Cited

U.S. PATENT DOCUMENTS

| | | | | |
|---|---|---|---|---|
| 2025/0285551 A1* | 9/2025 | Guedes | .................. | G09B 19/04 |
| 2025/0307955 A1* | 10/2025 | Manivelan | ............. | G06Q 50/01 |
| 2025/0321708 A1* | 10/2025 | Treat | ....................... | G10L 25/78 |
| 2025/0352907 A1* | 11/2025 | Crabtree | ................. | A63F 13/65 |

\* cited by examiner

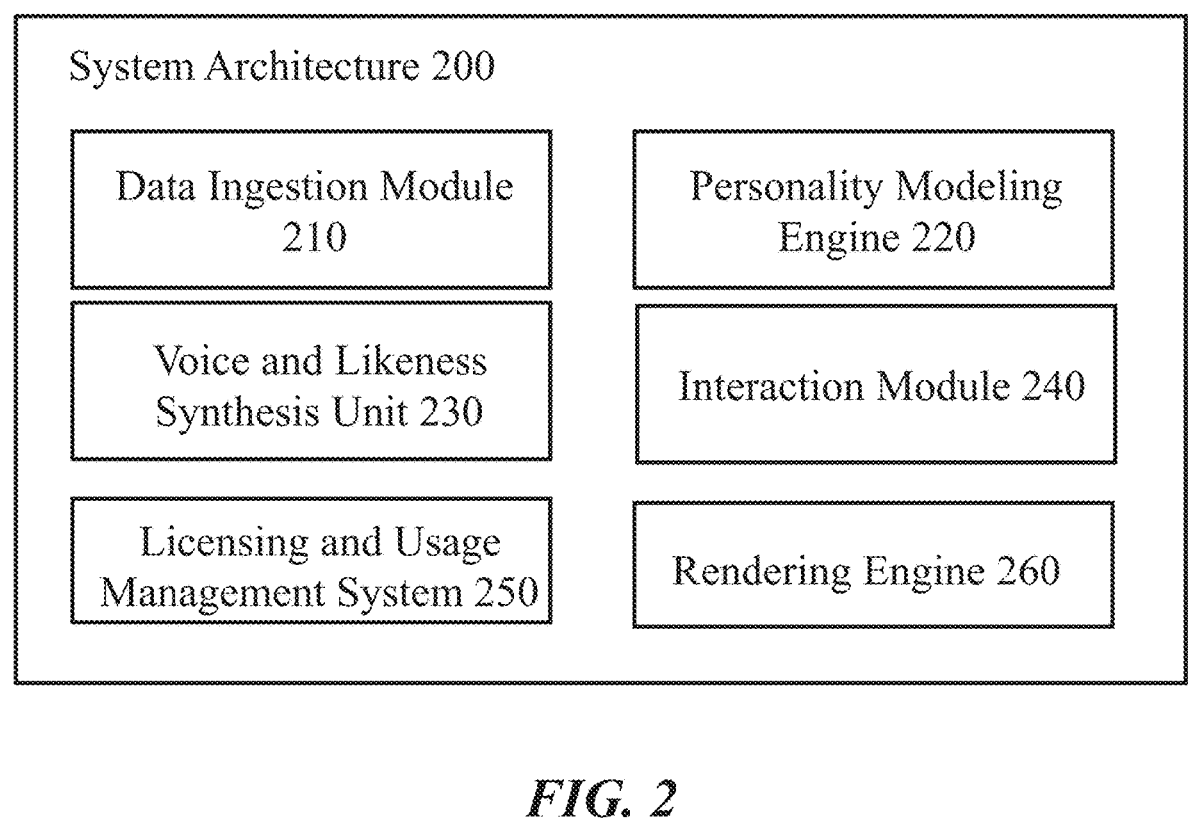

System Architecture 200

Data Ingestion Module 210

Personality Modeling Engine 220

Voice and Likeness Synthesis Unit 230

Interaction Module 240

Licensing and Usage Management System 250

Rendering Engine 260

*FIG. 2*

Step 310: Receiving multimodal data

Step 320: Generating a personality model

Step 330: Synthesizing voice and visual likeness

Step 340: Enabling interaction

Step 350: Managing licensing and monetization

Step 360: Animating avatar response

SYSTEMS AND METHODS FOR CREATING INTERACTIVE AI HUMAN AVATARS FROM MULTIMODAL DATA FOR LEGACY PRESERVATION, TRAINING, AND ENTERTAINMENT

TECHNICAL FIELD

The present invention relates generally to the field of artificial intelligence and digital avatar generation, and more specifically to systems and methods for creating interactive AI-based human avatars using multimodal data inputs for use in legacy preservation, education, entertainment, and commercial applications.

BACKGROUND

Over the past decade, digital communication and preservation technologies have rapidly evolved, with growing interest in systems that extend human presence beyond the limitations of physical space and time. The demand for more immersive, emotionally resonant digital experiences has been driven by advancements in machine learning, natural language processing, and 3D modeling. As users increasingly rely on virtual platforms for communication, education, and entertainment, the notion of representing individuals through digital surrogates (i.e., avatars) has shifted from novelty to necessity in domains such as virtual reality, remote education, and personalized support services.

Despite these advancements, most digital avatars to date have remained limited in realism and adaptability. Early systems often relied on pre-recorded responses or scripted interactions, offering little dynamic engagement. These avatars typically lacked the ability to model or reflect individual personality traits, decision-making patterns, or nuanced communication styles. Moreover, they were unable to synthesize input from diverse data types such as facial expressions, tone of voice, writing style, and emotional behaviors, which are essential for generating authentic, human-like digital representations.

Existing AI-based chat systems improved conversational engagement, but most were designed around generalized language models that simulate conversation in abstract or impersonal ways. While effective in some contexts, these models failed to capture the essence of a specific individual's mannerisms, memory, and evolving personality traits. Similarly, virtual assistants and entertainment bots have largely prioritized task execution or novelty over emotional intelligence, memory retention, and personalization. These limitations have restricted the utility of digital avatars in emotionally sensitive use cases such as family legacy preservation, grief support, and mentorship from lost loved ones.

A critical shortcoming in conventional avatar systems is the inability to synthesize multimodal data for constructing a unified behavioral model. Individuals are defined by more than their words, they are shaped by tone, cadence, gesture, visual presence, facial expressions, and a lifetime of behavioral patterns. Without integrating these modalities, digital avatars remain two-dimensional imitations rather than emotionally intelligent representations. Furthermore, many systems operate in isolated, cloud-based environments without giving users adequate control over data privacy, licensing, and ethical usage of their digital likeness.

Finally, current platforms often lack mechanisms to support monetization or authorized third-party use of an individual's avatar. This creates challenges for celebrities, educators, and professionals who may wish to license their likeness for commercial training, entertainment, or personal branding. Similarly, families wishing to preserve the likeness of a deceased relative are often forced to trust third-party platforms with limited transparency around data usage. The absence of ethical licensing frameworks, privacy-first deployment options, and personalized interaction models represents a major gap in the current technological landscape for human-avatar interaction.

There is currently no system capable of preserving a person's likeness, speech, emotional tone, and behavioral personality in a dynamic, interactive way that allows others to have meaningful conversations with a trusted, personalized digital version of that person. Existing tools either lack behavioral nuance, do not support secure consent or legacy control, or are limited to generic chatbot functions without connection to real-world identity or context.

SUMMARY OF THE INVENTION

This summary is provided to introduce a variety of concepts in a simplified form that is further disclosed in the detailed description of the embodiments. This summary is not intended for determining the scope of the claimed subject matter.

The embodiments provide a system and method for generating an interactive artificial intelligence (AI) avatar of a real individual using multimodal data. The system enables the realistic recreation of a person's personality, voice, and visual likeness for use across various applications such as legacy preservation, education, entertainment, and professional training. Each component of the system performs a specific function in the lifecycle of avatar creation and deployment, from data ingestion to monetization. The invention includes features to support ethical licensing, conditional content release, and privacy-first deployment. The architecture is modular and can be adapted for both cloud-based and local installations.

The system includes a Data Ingestion Module configured to receive and process multimodal data comprising one or more of photos, videos, audio recordings, written content, and behavioral profiling data. This module securely acquires data from various sources such as local uploads, social media archives, or sensor-based inputs. It performs preprocessing steps such as normalization, metadata extraction, and anonymization to prepare data for modeling. This preprocessing ensures compatibility with machine learning models used in later stages. The Data Ingestion Module serves as the foundational intake layer for the entire avatar generation pipeline.

The Personality Modeling Engine is configured to generate a personality model of the individual based on the multimodal data provided by the Data Ingestion Module. The personality model comprises personality traits, conversational style, decision-making patterns, and emotional tendencies. This component utilizes artificial intelligence algorithms such as large language models, Bayesian analysis, and behavioral clustering. In some embodiments, the engine generates personality trait vectors based on psychological assessment frameworks including the Big Five personality dimensions or Myers-Briggs Type Indicator (MBTI). The output of this module forms the behavioral foundation of the AI avatar.

The Personality Modeling Engine may also apply trait injection algorithms that modify AI responses in real time based on the personality trait vectors. For example, a trait score indicating high agreeableness may lead to more empathetic and conciliatory responses. Conversely, a low conscientiousness score may result in more casual or impulsive dialogue. These algorithms allow the avatar to exhibit nuanced behavioral shifts that align with the real individual's communication tendencies. This dynamic personality adaptation enhances the believability and emotional authenticity of the avatar.

The system further includes a Voice & Likeness Synthesis Unit configured to synthesize a digital voice and visual likeness of the individual using the personality model and the multimodal data. This module generates a photorealistic 3D avatar using green screen video footage or photogrammetry data. For voice synthesis, it employs neural network-based voice cloning techniques using the individual's audio recordings. The result is a consistent, recognizable voice and visual output that mirrors the real-life subject. This unit plays a critical role in creating an immersive, multi-sensory user experience.

In some embodiments, the Voice & Likeness Synthesis Unit generates a photorealistic avatar using automated 3D modeling pipelines such as rigging and facial animation based on input from depth sensors or standard cameras. This allows the system to reconstruct the individual's likeness with high fidelity, even in consumer-grade environments. The unit supports dynamic lip-syncing and facial gesture synthesis to maintain realism during conversation. These features allow the AI avatar to appear natural and emotionally expressive. All synthesized content is stored and served in formats compatible with the Rendering Engine.

The invention includes an Interaction Module configured to enable user interaction with the AI avatar via one or more interfaces selected from the group consisting of text-based interfaces, voice-based interfaces, video-based interfaces, and augmented or virtual reality environments. This module acts as the conversational front-end of the system, allowing users to engage with the AI avatar in a natural and multi-modal manner. It interprets user input and routes it through sentiment and context analyzers before returning a response. The module can support real-time interactions on smartphones, desktop applications, web platforms, and immersive XR headsets. It is platform-agnostic and extensible via API.

The Interaction Module includes a context memory engine configured to retrieve prior interactions for continuity in conversation. This enables the AI avatar to simulate memory and maintain long-term conversational threads, such as remembering a user's name or past topics. Historical data is stored in a secure interaction log tied to individual users or sessions. The avatar may also reference past events to establish a sense of relationship with the user. This capability supports emotionally rich and personalized interaction over time.

In some implementations, the Interaction Module further includes a sentiment analysis engine that adjusts responses based on the detected emotional tone of the user. This engine uses natural language processing and paralinguistic cues such as pitch or word frequency to infer user mood. Based on this sentiment, the avatar may respond with empathy, excitement, concern, or encouragement. These emotionally intelligent responses significantly improve engagement and realism. The sentiment engine works in tandem with the personality model to ensure contextual alignment.

The invention includes a Licensing & Usage Management System configured to track, authorize, and monetize third-party access to the AI avatar using a rights management protocol. This component ensures that only authorized users can interact with, distribute, or commercially deploy the AI avatar. It tracks usage metrics such as session duration, access type, and licensing tier. A secure rights database links each avatar instance to its corresponding owner, estate, or licensing agent. This enables traceable, auditable deployment of AI representations.

The Licensing & Usage Management System may include a blockchain-based smart contract layer for enforcing avatar usage rights. Smart contracts ensure automatic execution of terms such as compensation disbursement, licensing duration, and usage limits. All transactions are cryptographically secured and transparent to rights holders. This layer enables decentralized control and monetization of digital likenesses in a verifiable way. It is particularly valuable in celebrity, educational, or enterprise licensing scenarios.

In certain embodiments, the Licensing & Usage Management System supports monetization models selected from the group consisting of per-session access, subscription access, and NFT-based licensing. The per-session model allows individual interactions to be billed based on duration or intensity. Subscriptions offer ongoing access to a digital mentor, celebrity, or instructor. NFTs may be issued as unique tokens representing limited rights to specific avatars. These monetization strategies ensure ethical compensation for the use of a person's digital likeness.

The invention includes a Rendering Engine configured to animate the AI avatar in real time using sentiment-driven gestures, facial expressions, and synchronized speech output. The Rendering Engine ensures that the visual behavior of the avatar matches both the linguistic content and the emotional tone. It can animate head nods, hand gestures, facial changes, and lip-sync movements dynamically during conversations. The engine is optimized for real-time performance, even under high-latency conditions. It supports cross-platform output rendering for mobile, desktop, and XR devices.

The Rendering Engine may further synchronize lip movement of the AI avatar to the synthesized speech output using viseme-driven facial animation systems. These systems map phonemes to corresponding visual gestures to create realistic mouth movement. The engine also manages background elements such as lighting and camera positioning in virtual environments. Output formats include 2D video, 3D avatars, and holographic displays. The Rendering Engine integrates with AR/VR platforms to deliver immersive interactions.

In some embodiments, the Rendering Engine is configured to trigger avatar animations based on real-time analysis of user sentiment and conversational context. For example, a positive sentiment may trigger a smile animation, while a sad tone may result in a frown or concerned head tilt. These emotional signals are synchronized with speech and gesture timing to preserve conversational flow. The engine enables life-like, emotionally congruent responses. This enhances the credibility and empathy of the avatar.

The invention also includes a method for creating and deploying an interactive artificial intelligence avatar of a real individual. The method comprises receiving, by a Data Ingestion Module, multimodal data associated with the individual comprising photos, videos, audio recordings, written content, and behavioral profiling responses. The data is processed and normalized for downstream modeling. This method supports one-time ingestion as well as continuous updates. All data is encrypted in transit and at rest.

The method further comprises generating, by a Personality Modeling Engine, a personality model from the multimodal data, wherein the personality model includes quantified personality trait vectors. These vectors are used to personalize the avatar's behavior and communication. The method ensures alignment between trait scores and conversation style. Behavioral profiles can be refined over time through ongoing user interaction. This iterative process supports long-term personality fidelity.

The method further comprises synthesizing, by a Voice & Likeness Synthesis Unit, a voice model and a visual avatar representing the individual based on the personality model. Voice synthesis is accomplished using training data from the individual's audio library. The visual model is reconstructed from images and video. The resulting avatar preserves both the appearance and speech characteristics of the original individual. The model can be exported to standardized avatar formats for third-party use.

The method further comprises enabling, by an Interaction Module, natural language interactions between users and the AI avatar via one or more supported platforms. The method supports real-time conversation and memory continuity. All inputs are processed using contextual and emotional analyzers. Outputs are generated based on personality traits and sentiment. The avatar communicates in a way that is both context-aware and emotionally responsive.

The method further comprises managing, by a Licensing & Usage Management System, the rights, usage, and monetization of the AI avatar. The system validates licensing status before avatar deployment. Rights management is enforced through APIs, dashboards, or smart contracts. All usage is logged and attributed to specific license holders. This enables scalable and responsible deployment of digital avatars.

The method further comprises animating, by a Rendering Engine, the AI avatar using visual gestures, facial expressions, and synchronized voice responses based on sentiment analysis of the interaction. All animations are rendered in real time for immersive user experience. Visual expressions match conversational tone and context. The system adapts to various devices and bandwidth conditions. Output is optimized for lifelike realism.

In certain embodiments of the method, the system generates time- or milestone-triggered messages using the Interaction Module and stores them for conditional release. Messages may be triggered based on user age, calendar events, or system achievements. This feature is particularly useful for legacy preservation scenarios, such as a parent leaving milestone-based messages for a child. The system supports encrypted storage and verifies unlocking conditions. These interactions can occur years after the avatar is first deployed.

The method may also include deployment of the system locally or in a cloud environment based on a privacy configuration. Users with high sensitivity may opt for full local control. Commercial clients may choose cloud scaling with encryption and smart contract licensing. The system architecture supports modular deployment across hybrid infrastructures. This allows flexibility for various use cases and data sensitivity levels.

Additionally, the invention includes a non-transitory computer-readable medium storing instructions that, when executed by one or more processors, cause the system to perform the method steps described above using each of the inventive elements. The instructions are modularized by component, allowing updates to individual modules without affecting others. This architecture supports customization, scalability, and platform-specific optimization. The software stack includes APIs, deployment scripts, and inference engines. Documentation is included for system integration.

In one embodiment, the instructions cause the Personality Modeling Engine to update the personality model continuously based on new user interactions. In another embodiment, the instructions cause the Rendering Engine to output visual content in formats compatible with augmented reality, virtual reality, and holographic displays. Together, these features support the long-term evolution of AI avatars while preserving their original identity. The system ensures continuity, personalization, and ethical control of digital representations. This completes a fully integrated pipeline for emotionally intelligent, realistic, and interactive AI avatars.

BRIEF DESCRIPTION OF THE DRAWINGS

A complete understanding of the present embodiments and the advantages and features thereof will be more readily understood by reference to the following detailed description when considered in conjunction with the accompanying drawings wherein:

FIG. 2 is a block diagram illustrating an example system architecture for generating and deploying an interactive artificial intelligence avatar of a real individual using modular components, according to some embodiments;

DETAILED DESCRIPTION

Figure 1:
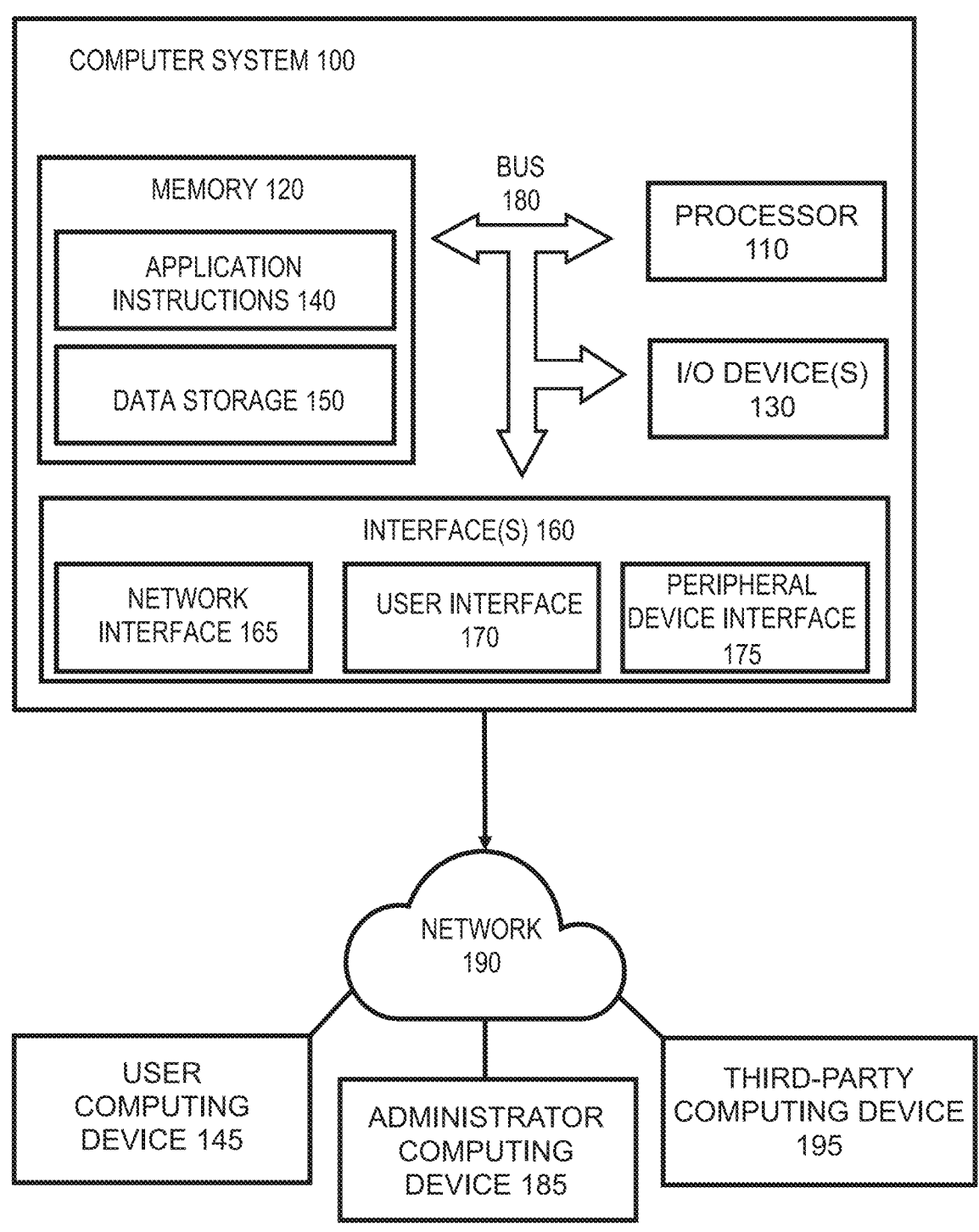
FIG. 1 illustrates a computer system architecture, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a system and method for generating an interactive artificial intelligence (AI) avatar of a real individual based on multimodal data. The system is designed to replicate the personality, voice, and likeness of a human subject with high fidelity, enabling dynamic and emotionally intelligent interactions across a variety of platforms. The system includes six key components: a Data Ingestion Module, a Personality Modeling Engine, a Voice & Likeness Synthesis Unit, an Interaction Module, a Licensing & Usage Management System, and a Rendering Engine. Each of these modules performs a specific function in the pipeline that enables avatar creation, deployment, interaction, and monetization. The system may be hosted locally or in a cloud environment and can be accessed via mobile, desktop, augmented reality (AR), or virtual reality (VR) platforms.

The Data Ingestion Module is configured to receive and process multimodal data comprising one or more of photos, videos, audio recordings, written content, and behavioral profiling data. This module functions as the intake layer of the system and is responsible for collecting raw input data that reflects the characteristics and history of the individual to be modeled. It may accept inputs from diverse sources, including cloud storage, local devices, online profiles, sensor feeds, and structured questionnaires. The Data Ingestion Module also performs data normalization, formatting, tagging, and filtering to ensure compatibility with downstream machine learning operations. This module may also implement encryption and access control protocols to protect the privacy of user data.

The Personality Modeling Engine is configured to generate a personality model of the individual based on the multimodal data processed by the Data Ingestion Module. The personality model comprises personality traits, conversational style, decision-making patterns, and emotional tendencies. This engine applies artificial intelligence techniques such as natural language processing, deep learning, statistical clustering, and psychological modeling to extract meaningful behavioral signals from the data. In some embodiments, the engine uses frameworks such as the Big Five personality traits or MBTI to generate personality trait vectors. The Personality Modeling Engine represents the cognitive and emotional core of the AI avatar and is responsible for producing contextually relevant and personality-consistent responses.

In certain embodiments, the Personality Modeling Engine further includes trait injection algorithms that modify AI responses in real time based on the personality trait vectors. These trait injection algorithms dynamically adjust the AI avatar's speech patterns, tone, empathy, humor, and expressiveness in accordance with the trait profiles. For example, if the personality vector reflects high openness, the avatar may use metaphor or creativity in its language generation. If the model shows high conscientiousness, the avatar may provide more structured, deliberate responses. These mechanisms ensure the avatar's conversational output mirrors the original subject's communication style and values.

The Voice & Likeness Synthesis Unit is configured to synthesize a digital voice and visual likeness of the individual using the personality model and the multimodal data. This unit combines advanced voice cloning and visual rendering technologies to reconstruct a highly realistic representation of the person. The voice synthesis component may use neural network-based models trained on the individual's voice recordings to recreate the voice with accurate tone, pitch, cadence, and inflection. The visual synthesis component generates a three-dimensional avatar using green screen video footage, 3D modeling, or photogrammetry techniques. The result is an avatar capable of expressive and emotionally resonant speech and gesture.

The Voice & Likeness Synthesis Unit may also integrate preprocessed video and facial capture data to generate dynamic visual avatars capable of real-time animation. In certain implementations, automated pipelines using tools like Blender may be used for rigging, texture mapping, and character modeling. Lip-sync systems are employed to align phoneme timing with visual speech movements, ensuring that facial animations are coordinated with voice output. The system may also support diverse output formats for integration with the Rendering Engine, including 2D video, WebGL, and 3D environments. Together, these features enable highly immersive user experiences.

The Interaction Module is configured to enable user interaction with the AI avatar via one or more interfaces selected from the group consisting of text-based interfaces, voice-based interfaces, video-based interfaces, and augmented or virtual reality environments. This module serves as the front-facing component of the system and facilitates real-time communication between users and the avatar. The Interaction Module receives input from the user, processes the input using sentiment and context analysis, and routes it through the Personality Modeling Engine for response generation. The generated response is then delivered back to the user through the appropriate communication channel. This interaction loop is optimized for low-latency operation and emotional coherence.

In some embodiments, the Interaction Module includes a context memory engine configured to retrieve prior interactions for continuity in conversation. This memory engine allows the avatar to remember and reference previous discussions, user preferences, or shared experiences. By maintaining contextual continuity across sessions, the avatar can form persistent relationships with users, enhancing trust and engagement. The memory engine may use indexed logs or relational databases to store structured interaction histories. Access to stored data is governed by user privacy settings and access permissions.

The Interaction Module may also include a sentiment analysis engine that adjusts responses based on the emotional tone of the user's input. This engine uses text sentiment classifiers and paralinguistic analysis to infer emotions such as joy, sadness, frustration, or excitement. Detected sentiment is factored into the avatar's response selection and delivery, enabling emotionally appropriate replies. When paired with the Personality Modeling Engine, the sentiment analysis engine allows the avatar to react not only in a human-like way but in a way that is consistent with the modeled personality of the individual. This dual-layer adaptation greatly enhances user experience and realism.

The Licensing & Usage Management System is configured to track, authorize, and monetize third-party access to the AI avatar using a rights management protocol. This component provides tools for digital rights enforcement, access control, and monetization management. It supports features such as license key verification, user authentication, and time-based access control. Rights holders, such as the individual, their estate, or a designated agent, may configure access policies and monitor usage. This system ensures that avatars are only accessed and deployed by authorized users under specified licensing conditions.

In certain embodiments, the Licensing & Usage Management System comprises a blockchain-based smart contract layer for enforcing avatar usage rights. These smart contracts execute licensing rules, track payments, and manage ownership using cryptographically signed transactions. Blockchain integration provides transparency and auditability, especially in commercial or celebrity applications where rights enforcement is critical. The system may use decentralized identifiers (DIDs) to link smart contracts to specific avatars. This ensures that all commercial use is tracked, logged, and compensated appropriately.

The Licensing & Usage Management System may further support monetization models selected from the group consisting of per-session access, subscription access, and NFT-based licensing. Each model corresponds to a different usage strategy: per-session access allows for temporary, pay-as-you-go interactions; subscriptions offer recurring revenue models for long-term avatar access; and NFT-based licensing provides unique, verifiable rights to specific avatar instances. These models can be configured via administrative dashboards and integrated with external payment gateways. Revenue collected may be automatically distributed to license holders per contractual terms.

The Rendering Engine is configured to animate the AI avatar in real time using sentiment-driven gestures, facial expressions, and synchronized speech output. This engine synthesizes visual feedback during user interactions to match the avatar's verbal and emotional output. It includes modules for facial rigging, body animation, gesture triggering, and timing control. The Rendering Engine operates on both mobile and high-performance desktop systems, with fallback mechanisms for lower-spec devices. The engine plays a crucial role in maintaining immersion and realism.

In some embodiments, the Rendering Engine synchronizes lip movement of the AI avatar to the synthesized speech output by mapping visemes to phonemes using audio-aligned animation. These animations are blended with sentiment-driven facial expressions to produce natural, expressive communication. The engine may also apply scene-level rendering, including lighting, camera angles, and background adjustments, to create cinematic output. The Rendering Engine supports output to AR/VR systems, holographic displays, and standard screens. Its real-time performance is optimized using GPU acceleration and asynchronous rendering pipelines.

Together, the Data Ingestion Module, Personality Modeling Engine, Voice & Likeness Synthesis Unit, Interaction Module, Licensing & Usage Management System, and Rendering Engine form a comprehensive system for creating lifelike and interactive AI avatars of real individuals. The system is designed to be modular, scalable, and adaptable to different deployment environments and user needs. Each claimed component contributes a necessary function to the overall pipeline, ensuring the avatar behaves, speaks, and appears in a manner consistent with the original individual. This invention addresses long-standing limitations in digital avatar systems by enabling high-fidelity, ethically governed, emotionally adaptive AI representations of people. The described system architecture enables a new category of personalized, interactive digital experiences rooted in human identity and emotional resonance.

In one preferred implementation of the system, the data ingestion and avatar interaction pipeline utilizes state-of-the-art tools that are modular and upgradeable over time. For speech-to-text processing during audio ingestion, the system preferably integrates Whisper by OpenAI, which provides high-accuracy transcription of voice recordings across multiple languages and audio conditions. For generating real-time, personality-consistent conversational responses, the system uses a large language model to process user input, apply context memory, and generate fluent, emotionally aware replies.

For video rendering and facial animation, the system may integrate Synthesia, or a comparable avatar video rendering platform, to produce dynamic and lifelike simulations of the synthesized digital avatar. The avatar may be rendered with synchronized speech, facial expressions, and gestures based on output from the rendering engine and personality modeling engine. While these specific platforms are used in the preferred embodiment, the system is designed in a modular fashion, such that any equivalent third-party service or proprietary tool may be substituted for each component provided that it performs the same or substantially similar function.

This modular architecture ensures forward compatibility and adaptability as newer or more efficient tools become available. The system architecture exposes internal APIs for each module, enabling the substitution, upgrade, or customization of any component without requiring modification to the entire pipeline. In this way, the best mode implementation satisfies performance and fidelity goals, while allowing continued evolution of the system through integration with newer technologies.

The system implements life-based personality modeling, wherein the avatar is trained using actual video, documents, behavioral patterns, and speech samples from a specific, real individual. Unlike generic chatbot architectures or fictional character models, this invention grounds the avatar's cognitive and emotional responses in the lived history and personal attributes of a real person. The system constructs a unique, traceable behavioral profile using multimodal data to generate an AI avatar that embodies individual conversational style, tone, and identity.

The invention also supports real-time avatar rendering through tools such as the Blender API, or comparable rendering frameworks. This allows for dynamic, procedural animation of the avatar's face and body, including rigged skeletal movement, emotion-triggered gestures, and scene-aware spatial positioning. Procedural rendering ensures that the avatar responds in real time to conversational inputs, rather than relying on pre-rendered video segments or static images.

A core feature of the system is the consent and licensing layer, which implements smart-contract-based control for user- or estate-defined permissions, licensing rights, monetization terms, and audit logs. This layer ensures ethical and lawful deployment of digital likenesses and allows individuals or their representatives to manage how, when, and by whom their avatar is accessed. The blockchain-based licensing engine also enables transparent monetization models, including per-session fees, subscriptions, and NFT-based ownership of avatar instances.

The system further supports consumer-grade 3D modeling input, allowing users to generate accurate digital avatars using readily available tools such as iPhone LiDAR scans, facial selfies, or motion-capture data. This democratizes avatar creation by eliminating the need for expensive studio-grade equipment and enables broader adoption of the system across non-technical users.

Emotional and behavioral personality tuning is another critical feature. The personality modeling engine aligns system responses with modeled personality traits, such as gentleness, assertiveness, humor, or compassion. Trait injection algorithms allow the AI avatar to express these qualities during conversation in a way that mirrors how the real individual would respond under similar conditions. This alignment ensures authenticity in communication and emotional resonance with users.

The invention is intended for cross-domain applications, with utility spanning a range of social, emotional, commercial, and educational contexts. Example applications include: Teaching from modeled educators: Enabling students to engage with an avatar of a historical or living subject-matter expert for enhanced learning. Grief and memorial support: Allowing families to interact with avatars of deceased loved ones for emotional continuity and healing. Religious and spiritual engagement: Facilitating interactions with faith-based figures or mentors in confessional, advisory, or ceremonial contexts. Pediatric therapeutic tools: Delivering comfort and guidance to children through friendly, personalized avatars modeled after caregivers, siblings, or known characters. On-demand expert consultation: Allowing professionals, such as physicians, lawyers, or coaches, to license an AI version of themselves to provide recurring consultation without real-time availability.

These distinguishing elements, alone and in combination, differentiate the present invention from prior art systems focused solely on chatbot interaction, static memorialization, or generic virtual assistant deployment. The claimed invention integrates multimodal data, emotional intelligence, real-time rendering, and ethical governance to create interactive avatars that preserve, reflect, and project authentic human presence.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," "data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. Hosting platforms may be implemented including public or private clouds. Further, various cloud storage system including table storage, blob storage databases, etc. may be used. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

FIG. 2 is a block diagram illustrating an example system architecture 200 for generating and deploying an interactive artificial intelligence (AI) avatar of a real individual. As shown, the system 200 includes a data ingestion module 210, a personality modeling engine 220, a voice and likeness synthesis unit 230, an interaction module 240, a licensing and usage management system 250, and a rendering engine 260. Each of these modules is functionally distinct but may communicate through one or more data pipelines, shared memory structures, or cloud-based APIs. The system 200 may be implemented in a distributed computing environment, a standalone software platform, or a hybrid cloud-local architecture depending on privacy and performance requirements. The modular structure allows the components to be deployed independently or in combination, offering flexible configuration for different applications, including legacy preservation, education, entertainment, and commercial use.

FIG. 2 illustrates a block diagram of a system 200 for generating and managing an interactive artificial intelligence (AI) avatar of a real individual. The system 200 comprises multiple interrelated components, including a data ingestion module 210, a personality modeling engine 220, a voice and likeness synthesis unit 230, an interaction module 240, a licensing and usage management system 250, and a rendering engine 260. These components work in concert to ingest data, model personality traits, generate synthetic likenesses, enable real-time interaction, enforce ethical licensing, and render animated output. Each module is functionally discrete but data-connected through shared memory or API pipelines. System 200 may be deployed in cloud-based or local environments depending on the privacy and scalability needs of the user.

The data ingestion module 210 is configured to receive and process multimodal data comprising one or more of photos, videos, audio recordings, written content, and behavioral profiling data. This module functions as the system's primary input pipeline, responsible for capturing raw, structured or unstructured personal data associated with the individual to be modeled. In some embodiments, the data ingestion module 210 may interface with cloud services, mobile applications, local storage, or third-party APIs to collect and synchronize data.

In certain implementations, the data ingestion module 210 performs normalization, de-duplication, format conversion, and tagging of the incoming data to enable downstream compatibility with machine learning models. The module may implement secure data transfer protocols such as TLS encryption and offer options for user-controlled permissions or opt-in capture methods. The ingestion layer may also allow batch imports of legacy data, including previously recorded interviews or family photo albums.

To enhance security and data provenance, the data ingestion module 210 may generate and store cryptographic hashes of received media files. This ensures that any modification to the input data is detectable and verifiable during later stages of avatar deployment. The system may also maintain metadata describing the source, timestamp, and content type of each file ingested.

The personality modeling engine 220 is configured to generate a personality model of the individual based on the multimodal data provided by the data ingestion module 210. The personality model comprises personality traits, conversational style, decision-making patterns, and emotional tendencies. This module serves as the behavioral core of the system 200 and is responsible for determining how the AI avatar will think, speak, and emotionally respond.

In one embodiment, the personality modeling engine 220 uses machine learning models such as transformer-based natural language models, Bayesian inference systems, or hybrid symbolic-neural networks. These algorithms analyze textual and audiovisual inputs to extract semantic style, emotional tone, and behavioral consistency. The output is a multidimensional vector representation of the individual's personality.

The personality modeling engine 220 may also implement trait injection algorithms that modify the avatar's generated responses based on quantified personality trait vectors. For example, personality attributes aligned with the Big Five framework, such as agreeableness, conscientiousness, or openness, may influence response structure, tone, or assertiveness. The engine may be retrainable over time as new data is ingested or as the avatar adapts through interaction.

In certain cases, the personality modeling engine 220 is configured to incorporate structured behavioral profiling data obtained from user-completed assessments, psychometric tests, or preference scoring systems. The integration of explicitly declared traits with inferred behavioral tendencies allows for a comprehensive and dynamically adaptive personality model.

The voice and likeness synthesis unit 230 is configured to synthesize a digital voice and visual likeness of the individual using the personality model generated by the personality modeling engine 220 and the multimodal data received by the data ingestion module 210. This unit comprises two major subsystems: a voice cloning engine and a visual modeling engine.

The voice cloning subsystem may use neural network-based models trained on the individual's recorded voice samples to create a text-to-speech engine capable of reproducing the person's pitch, cadence, intonation, and vocal texture. This model may be fine-tuned to include emotional modulation based on conversation context or sentiment input. Output voice files may be produced in real time or batch-rendered depending on the interaction mode.

The visual modeling engine constructs a three-dimensional avatar of the individual using video footage, depth camera inputs, or still images. In one embodiment, the system uses green screen video combined with photogrammetry to extract body geometry and facial textures. Alternatively, it may use open-source 3D modeling tools for mesh generation and character rigging. The avatar is rendered to closely resemble the individual in facial features, hair, clothing style, and general demeanor.

The voice and likeness synthesis unit 230 may also integrate facial landmark tracking and expression mapping to animate lip movement and facial reactions in synchronization with synthesized speech. This enables dynamic, realistic presentation of the avatar during interactive sessions.

The interaction module 240 is configured to enable user interaction with the AI avatar via one or more interfaces selected from the group consisting of text-based interfaces, voice-based interfaces, video-based interfaces, and augmented or virtual reality environments. The interaction module 240 acts as the user-facing communication interface and supports multimodal input/output channels for seamless engagement.

The interaction module 240 includes natural language processing pipelines that analyze user input for intent, emotion, and contextual continuity. In some embodiments, the module includes a context memory engine configured to retrieve prior interactions and inject relevant historical context into the response logic. This enables the avatar to maintain memory of past interactions and sustain long-term conversational threads.

A sentiment analysis engine within the interaction module 240 may be used to interpret the emotional state of the user and adjust the avatar's verbal and non-verbal behavior accordingly. This includes modulation of voice tone, selection of empathetic language, and triggering of expressive animations.

The interaction module 240 is platform-agnostic and supports deployment on web browsers, mobile apps, XR headsets, smart televisions, and custom devices. In some versions, it includes APIs for third-party developers to embed interaction capabilities into external applications.

The licensing and usage management system 250 is configured to track, authorize, and monetize third-party access to the AI avatar using a rights management protocol. This system enables owners or license holders to control and monitor how avatars are deployed, ensuring ethical usage and proper attribution.

In some embodiments, the licensing and usage management system 250 incorporates a blockchain-based smart contract infrastructure for defining licensing terms, tracking payments, and enforcing digital rights. Smart contracts automatically execute agreements when predefined conditions are met, such as duration of use or number of accesses.

The system 250 may support monetization models selected from the group consisting of per-session access, subscription access, and NFT-based licensing. Each license may be associated with a unique identifier and tied to metadata describing usage scope, expiration, and ownership history.

Additionally, the licensing and usage management system 250 includes administrative dashboards for rights holders to manage permissions, view usage analytics, and receive automated payouts. All transactions are securely logged, and license violations can trigger automatic revocation or penalties.

The rendering engine 260 is configured to animate the AI avatar in real time using sentiment-driven gestures, facial expressions, and synchronized speech output. The rendering engine ensures that every interaction with the avatar is visually and emotionally aligned with the spoken or written communication generated by the avatar.

In one embodiment, the rendering engine 260 uses facial animation systems based on phoneme-to-viseme mapping to align lip movement with synthesized speech output. The engine may also trigger predefined gesture animations based on emotional tone or interaction context, such as smiling, nodding, or expressing concern.

The rendering engine 260 supports output in multiple display modes, including 2D web renderings, 3D XR environments, and holographic projection systems. It may optimize rendering performance using hardware acceleration, adaptive resolution scaling, and frame interpolation.

In certain configurations, the rendering engine 260 may work in tandem with the interaction module 240 to reflect real-time user sentiment through avatar reactions, thereby enhancing the sense of empathy and presence. The rendering engine 260 may also support integration with third-party avatar engines or virtual environment tools.

In one embodiment, input collection is performed through a mobile application or web-based interface, enabling the user to upload multimodal data comprising video recordings, audio logs, images, and written documents. These data sources may include family interviews, monologues, voice memos, casual conversations, journal entries, emails, social media posts, and more. The data ingestion module 210 receives these inputs, validates file integrity, and categorizes them by media type and source. The ingestion process may also capture associated metadata such as device ID, location, timestamp, and content type to support contextual modeling.

Each uploaded file is stored in a cloud-based repository with encryption at rest and in transit. Access controls and consent-based tagging may be applied to individual files or entire data sessions, ensuring the user retains control over privacy and content availability. An optional preprocessing engine within module 210 can anonymize or redact sensitive content based on jurisdictional privacy laws. The ingestion pipeline supports asynchronous batch uploads and real-time ingestion from live sessions, and may provide visual feedback or transcription previews during the upload process.

Audio files captured by the ingestion module are transcribed using automatic speech recognition (ASR) systems such as OpenAI Whisper, Deepgram, or equivalent frameworks. The ASR engine processes speech into timestamped textual segments, each of which is indexed to its corresponding location in the original media. The indexing mechanism preserves alignment between the spoken content and visual/audio cues, allowing the system to reference specific memory points during conversation.

In addition to transcription, the system may extract prosodic features such as intonation, pacing, and pauses. These features are stored as metadata alongside the text transcript and used later for voice cloning and emotional modeling. Transcripts are ingested into a searchable database accessible by the personality modeling engine 220 and the interaction module 240, enabling direct retrieval of life events during avatar interaction. Sentence-level embeddings and speaker segmentation may also be performed at this stage for downstream clustering and fine-tuning.

Once the textual data is structured, the personality modeling engine 220 initiates fine-tuning of a large language model, using the user's speech patterns, word choice, sentence structure, and conversational logic. The model is fine-tuned in a manner that reflects the tone, demeanor, and thought patterns exhibited by the user across different contexts. This allows the resulting AI avatar to produce linguistically coherent and personality-consistent responses in future interactions.

To support memory and contextual reasoning, the system generates embedding spaces and topic-based memory graphs from the user's content. These memory graphs link nodes representing key concepts, life events, and recurring subjects (e.g., "my graduation," "mom's cooking," "camping with kids"). The graphs are continuously updated as new data is ingested and serve as a retrieval layer for the interaction module 240. This structure allows the system to engage in non-linear, memory-enriched dialogue and recall lived experiences with emotional and narrative depth.

The user's voice samples are processed by the voice and likeness synthesis unit 230, specifically through a neural voice synthesizer subcomponent that interfaces with third-party voice cloning services such as ElevenLabs, Resemble AI, or iSpeech. The synthesizer generates a model capable of producing speech in the user's voice using only text inputs. The output mimics prosody, accent, pitch, pacing, and emotional range of the original speaker, creating a synthetic voice indistinguishable from the human counterpart.

This voice model is stored securely and can be accessed by the interaction module 240 and rendering engine 260 for real-time or batch audio generation. The system may support different emotional styles (e.g., cheerful, reflective, serious) for different interaction contexts. Optional fallback voices or anonymized versions may be created for use cases requiring partial privacy or pseudonymity. Quality control processes may include a side-by-side playback review or A/B testing interface for the user to approve and refine the synthesized output.

The visual component of the avatar is generated by the voice and likeness synthesis unit 230, using data such as TrueDepth scans, multi-angle photographs, or high-resolution video clips provided during the ingestion stage. The avatar generation pipeline includes steps for 3D mesh generation, facial landmark mapping, rigging, and texture application. In one embodiment, tools such as Ready Player Me, Synthesia, or D-ID may be used to assist in automating these processes and outputting a usable animation rig.

The resulting avatar can be animated with real-time lip-syncing and facial expressions mapped to synthesized voice content. The avatar may be rendered in 2D, 3D, or AR/VR formats, depending on the user's device and platform. Customization options allow the user to choose attire, background, expression intensity, and animation style. These assets are fed into the rendering engine 260 for compositing, output encoding, and interactive display during live sessions.

During a live interaction, the interaction module 240 receives a user query via text, voice, or multimodal interface. A memory retrieval system within the module searches for relevant life events, quotes, or past conversations stored in the topic-based memory graph. If a relevant memory is located, it is appended as context to the user's prompt and routed through the fine-tuned language model generated by the personality modeling engine 220.

The conversational output is thus a hybrid of generative language and memory-recall mechanics. The system supports follow-up prompts, clarifying questions, and contextual continuity across sessions. In some embodiments, the user can "rewind" or "zoom in" on particular memories, triggering playback of the original source media or summarized experiences. The interaction module is designed to maintain behavioral coherence and simulate natural long-term relationships with users.

The output generated by the AI avatar may be rendered in multiple modalities depending on the device and use case. These include textual display (e.g., in a chat interface), audio output using the personalized synthetic voice, and video rendering of the avatar delivering the response with appropriate facial expressions and gestures. The rendering engine 260 synchronizes these outputs for simultaneous multimodal delivery when supported.

The system may also generate timeline memory highlights, which are short excerpts or summaries from the user's personal archive that relate to the current conversation. These may include clips of original audio, photos with captions, or video snippets that were indexed during the ingestion phase. This feature enhances emotional authenticity and offers users a vivid, memory-enriched experience. The avatar may introduce such highlights during moments of reflection, nostalgia, or teaching.

Finally, the completed AI avatar is delivered via a platform-agnostic delivery layer, supporting deployment on mobile apps, web browsers, VR headsets, smart displays, and other devices. The system's modularity allows components to be activated or deactivated depending on platform capability, for example, offering a text-only chatbot for low-bandwidth users or enabling full audiovisual output for immersive devices.

In some embodiments, the system supports offline operation through preloaded data and models stored on the device. All interactions and learning updates may be stored locally and synchronized when reconnected. With appropriate permissions, the system may also allow continuous learning, updating the memory graphs and personality model based on new conversations, experiences, or user-uploaded content. The delivery system also supports session-based user authentication and dashboard tools for avatar owners or estate administrators.

Figure 3:
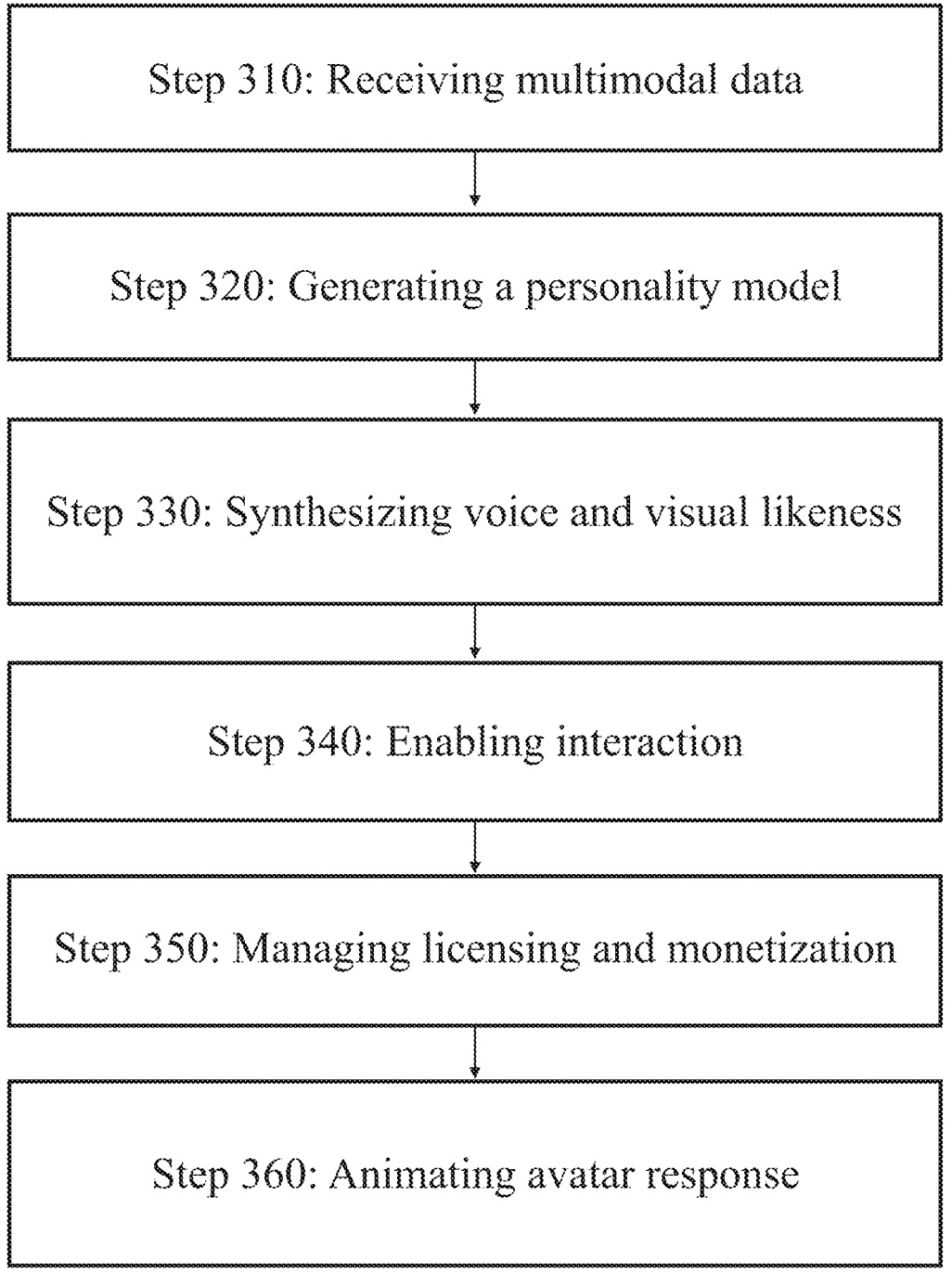
FIG. 3 is a flowchart illustrating a method for creating and interacting with an artificial intelligence avatar through six sequential processing steps, according to some embodiments.

FIG. 3 is a flowchart illustrating a method for creating and deploying an interactive artificial intelligence (AI) avatar of a real individual using multimodal data. The method includes six sequential steps: receiving multimodal data (step 310), generating a personality model (step 320), synthesizing voice and visual likeness (step 330), enabling interaction (step 340), managing licensing and monetization (step 350), and animating avatar responses (step 360). These steps may be performed by corresponding components described in FIG. 2 and executed by one or more processors configured to carry out the operations stored in a non-transitory computer-readable medium. The method enables a comprehensive and ethically managed system for deploying personality-rich AI avatars in real-time, emotionally intelligent applications.

At step 310, the method comprises receiving, by a data ingestion module, multimodal data associated with the individual comprising photos, videos, audio recordings, written content, and behavioral profiling responses. This step is essential for establishing a comprehensive dataset that reflects the identity and behavioral patterns of the real individual. The data may be provided directly by the user or accessed from authorized repositories, including cloud storage platforms, mobile devices, or structured surveys.

The data ingestion module performs preprocessing on all received data to ensure it is normalized and compatible with downstream AI algorithms. This may include operations such as converting image formats, extracting metadata, anonymizing sensitive inputs, and tagging key behavioral features. Behavioral profiling responses may include results from psychometric assessments, preference questionnaires, or structured interviews.

In some embodiments, the ingestion step includes establishing secure communication protocols for data transmission and user authentication. The system may also prompt users to validate or curate the data collected before proceeding to modeling. This ensures the integrity, consent, and authenticity of the multimodal data used in subsequent steps.

At step 320, the method comprises generating, by a personality modeling engine, a personality model from the multimodal data, wherein the personality model includes quantified personality trait vectors. This personality model forms the cognitive and emotional foundation of the AI avatar and determines how it communicates and responds to stimuli.

The personality modeling engine applies machine learning techniques, such as transformer-based language models, clustering algorithms, and Bayesian inference, to extract behavioral patterns from textual, audio, and visual inputs. These patterns are translated into trait vectors based on psychological frameworks such as the Big Five or MBTI. For instance, word usage frequency, emotional tone in writing, and inflection in audio may be mapped to traits like openness, conscientiousness, or extraversion.

The generated personality model is stored in structured form, such as a JSON-based vector schema, and can be reused across avatar instantiations or deployments. The model may also be configured to evolve over time, updating dynamically as the system receives new data or learns from user interactions. The accuracy and adaptability of the personality model ensure that the AI avatar exhibits consistent, lifelike behavior.

At step 330, the method comprises synthesizing, by a voice and likeness synthesis unit, a voice model and a visual avatar representing the individual based on the personality model. This step creates the perceptual and expressive elements of the AI avatar, translating personality and data inputs into a photorealistic, interactive representation.

The voice model is generated using neural network-based voice cloning techniques trained on audio recordings received during step 310. These models replicate not only the tonal characteristics of the individual's voice but also capture cadence, rhythm, and emotional inflection. The speech synthesis component is compatible with real-time and batch-processing modes, supporting natural conversation.

In parallel, the visual avatar is constructed using 3D modeling, green screen video footage, or photogrammetry. This may involve generating a facial mesh, rigging a skeletal structure for animation, and applying texture mapping. The final output is a high-fidelity avatar with facial features, body proportions, and styling that closely mirror the original subject.

The synthesis unit also aligns the visual and auditory components, ensuring synchronization between voice output and facial expressions. This allows the avatar to convey emotion and intent in a lifelike manner during subsequent interactions.

At step 340, the method comprises enabling, by an interaction module, natural language interactions between users and the AI avatar via one or more supported platforms. This step brings the avatar to life by making it responsive to real-time input across a range of modalities.

The interaction module may support text, voice, or video input from the user and can be accessed through devices such as smartphones, desktop browsers, XR headsets, or smart displays. Incoming communication is analyzed using natural language understanding pipelines and passed through the personality model to generate a contextually appropriate response.

In certain embodiments, the interaction module includes a context memory engine that stores previous conversations and retrieves them to maintain continuity. This allows the avatar to recall facts, preferences, or sentiments previously expressed by the user, creating a sense of memory and deepening user engagement.

The interaction system also integrates sentiment analysis, enabling the avatar to interpret emotional cues from voice or text and tailor its responses accordingly. This creates a dynamic and emotionally aware interaction loop between the user and the avatar.

At step 350, the method comprises managing, by a licensing and usage management system, the rights, usage, and monetization of the AI avatar. This step ensures that any third-party deployment or public interaction with the avatar is legally authorized and ethically controlled.

The licensing and usage management system implements a rights management protocol that verifies access credentials and enforces contractual licensing terms. These terms may be configured by the individual, an estate, or a licensing administrator, and define usage limits, expiration periods, and monetization models.

In certain embodiments, the system includes a blockchain-based smart contract infrastructure that automatically logs interactions and distributes royalties. This allows for decentralized enforcement of licensing terms and transparent financial transactions.

Available monetization strategies may include per-session fees, monthly subscriptions, or NFT-based avatar licenses. The licensing system may be integrated into commercial platforms, educational portals, or entertainment apps, providing detailed usage analytics and compliance auditing for rights holders.

At step 360, the method comprises animating, by a rendering engine, the AI avatar using visual gestures, facial expressions, and synchronized voice responses based on sentiment analysis of the interaction. This step translates generated responses into coordinated visual and auditory outputs for delivery to the user.

The rendering engine generates lip-sync animations that correspond to the synthesized speech output, using phoneme-to-viseme mapping. Facial expressions such as smiling, nodding, or eyebrow raises are triggered based on emotional tone detected in the conversation.

In certain implementations, full-body gestures or avatar poses may be rendered in three-dimensional space for XR environments. The rendering engine may output in real-time across different display mediums, including flat screens, VR headsets, or holographic projectors.

The animation process is tightly integrated with the interaction module to reflect the avatar's personality, memory, and emotion in every user-facing frame. This final step in the method creates a fully embodied digital presence capable of expressive, interactive, and emotionally authentic behavior.

Figure 4:
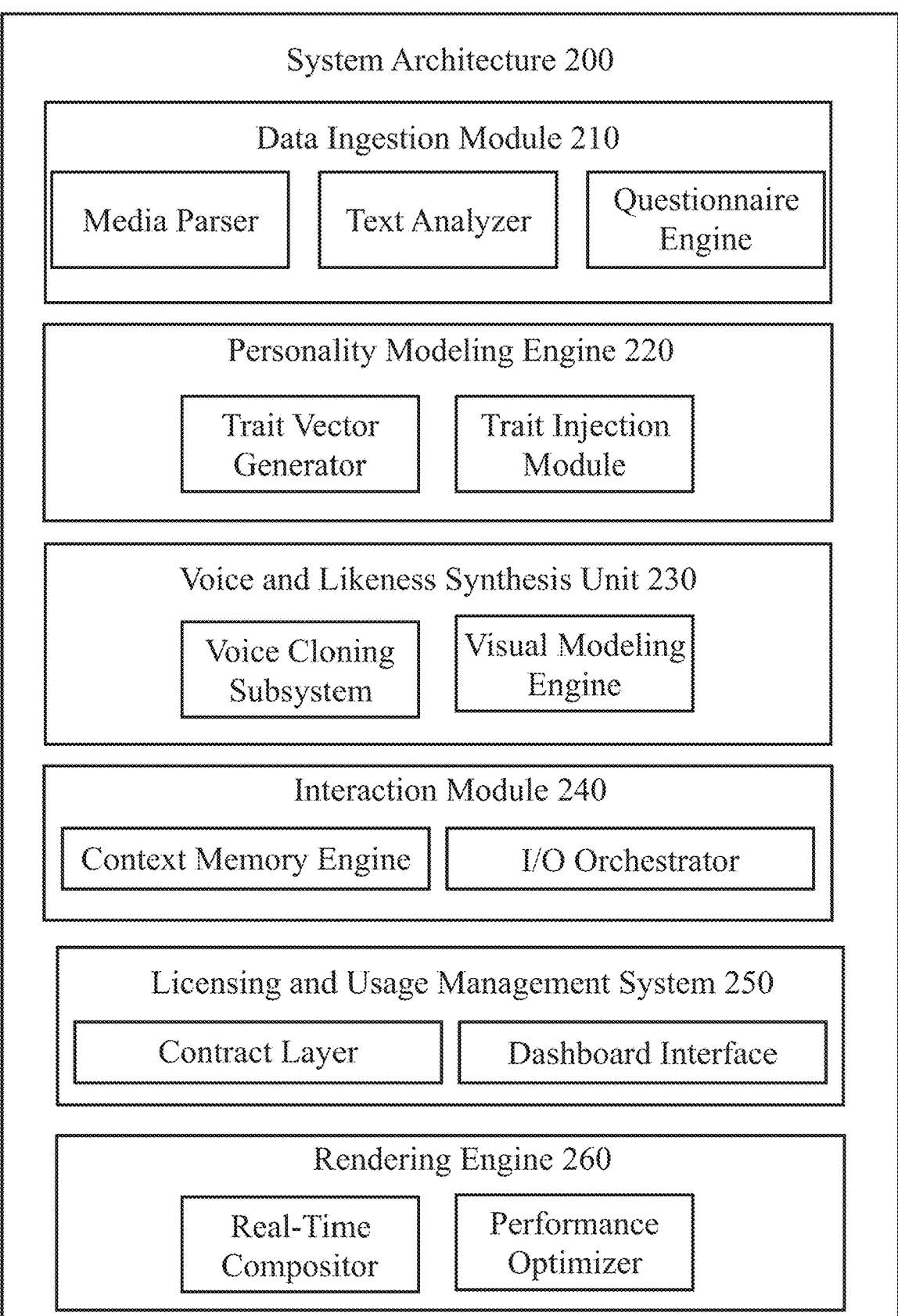
FIG. 4 is a block diagram illustrating an expanded system architecture showing subcomponents of each module used to generate and deploy an interactive artificial intelligence avatar of a real individual, according to some embodiments.

FIG. 4 illustrates an expanded architectural view of system 200, which includes a sequence of interconnected components for generating, managing, and deploying an interactive artificial intelligence (AI) avatar of a real individual. The illustrated components include a data ingestion module 210, a personality modeling engine 220, a voice and likeness synthesis unit 230, an interaction module 240, a licensing and usage management system 250, and a rendering engine 260. Each module contains internal subcomponents that perform specialized operations contributing to the generation and deployment of personality-consistent avatars. These modules may operate sequentially, in parallel, or asynchronously, depending on system configuration and user deployment preferences.

The data ingestion module 210 is configured to receive and process multimodal data comprising one or more of photos, videos, audio recordings, written content, and behavioral profiling data. This module serves as the system's primary intake and acquisition layer and establishes the foundation for all subsequent processing stages. It supports both manual uploads from users and automated retrieval from connected cloud services, mobile devices, or social media platforms. Incoming data is passed through validation filters to ensure file integrity, data type compliance, and metadata completeness.

Internally, the data ingestion module 210 includes a media parser for extracting content from visual and audio files, a text analyzer for processing documents, and a questionnaire engine for behavioral assessments. Each subcomponent formats the data into a unified schema for downstream consumption. The media parser may apply facial recognition or voice fingerprinting to verify that the data corresponds to the intended subject. The text analyzer can also identify sentiment, topic, and linguistic style attributes in email archives, chat logs, or personal writings.

Additionally, the module may perform anonymization, tagging, or encryption based on user preferences or jurisdictional data protection laws such as GDPR or HIPAA. Metadata such as timestamps, source paths, or file confidence scores may also be appended for audit and verification. The processed data output from module 210 is routed via a secure channel to the personality modeling engine 220 for further analysis. In some embodiments, a data staging area may be used to allow human curation or moderation of inputs before they are incorporated into the system pipeline.

The personality modeling engine 220 is configured to generate a personality model of the individual based on the multimodal data processed by the data ingestion module 210. This personality model comprises personality traits, conversational style, decision-making patterns, and emotional tendencies, which are used to define the behavioral characteristics of the AI avatar. The engine applies artificial intelligence algorithms such as transformer-based language models, Bayesian reasoning, and statistical clustering to extract trait dimensions from the input data.

A trait vector generator within this module encodes the extracted features into numeric representations using psychological frameworks such as the Big Five personality dimensions and MBTI. These vectors serve as core parameters that influence how the avatar speaks, reacts, and expresses itself in future interactions. The modeling engine also includes a behavioral classifier that interprets gesture frequency, emotional tone, and preference indicators from recorded video and voice inputs. These classifiers help refine the avatar's conversational pacing, emotional range, and default social style.

In certain embodiments, a trait injection module is used to dynamically adjust generated outputs based on user-specific personality scores. For example, a user with high openness may trigger more creative and metaphorical speech patterns, while one with high agreeableness may result in warmer and more conciliatory dialogue. This real-time adaptation ensures that the AI avatar maintains behavioral consistency across sessions. Once generated, the personality model is stored in an internally addressable repository and made accessible to the voice and likeness synthesis unit 230 and the interaction module 240.

The voice and likeness synthesis unit 230 is configured to synthesize a digital voice and visual likeness of the individual using the personality model and multimodal data. This module contains two primary subsystems: a neural voice synthesizer and a visual avatar composer. The neural voice synthesizer is trained on audio recordings provided by the user and generates a text-to-speech model that reproduces not only speech content but also prosodic features such as tone, pitch, inflection, and rhythm. Voice outputs are generated in real time and can be modulated based on contextual factors such as emotional tone or conversational intensity.

The visual avatar composer reconstructs the subject's appearance using uploaded images, video, or depth-sensing data. It may employ 3D photogrammetry, facial landmark mapping, or mesh generation techniques to build a high-fidelity visual model. Key physical traits, such as skin tone, facial structure, eye color, and hairstyle, are replicated to match the real individual as closely as possible. Optional clothing customization and background environment features may also be added to support deployment across different platforms.

The unit also includes a lip-sync synchronization engine that maps phonemes from synthesized voice data to visemes for visual alignment during avatar animation. This synchronization ensures the avatar appears to speak naturally and fluidly in real time. The output from the voice and likeness synthesis unit 230 is transmitted to both the interaction module 240 for live communication and the rendering engine 260 for display animation. These synthesized assets form the audiovisual core of the AI avatar's identity.

The interaction module 240 is configured to enable user interaction with the AI avatar via one or more interfaces selected from the group consisting of text-based interfaces, voice-based interfaces, video-based interfaces, and augmented or virtual reality environments. This module serves as the conversation engine and manages real-time communication between users and the AI avatar. It supports multimodal input handling, including typed messages, spoken commands, webcam gestures, or motion tracking in immersive systems.

The interaction module 240 includes a context memory engine that stores and retrieves prior user interactions to enable long-term memory and personalized conversational flow. For example, the avatar may remember a user's name, preferred topics, or previous emotional states to shape future dialogues. A sentiment analysis engine is used to evaluate emotional cues from user inputs, which may affect the tone, pacing, or content of avatar responses. These features collectively enable the avatar to form emotionally intelligent and socially aware relationships with users.

The module also includes an I/O orchestrator that determines how responses are formatted and delivered based on the output channel. On mobile platforms, it may return text and voice responses with simplified visuals; in VR, it may trigger full-body gestures and facial animations. The interaction module 240 draws on the personality model created by module 220 and the visual/voice assets from module 230 to generate consistent, high-fidelity communication. Its API architecture supports deployment in both first-party and third-party applications.

The licensing and usage management system 250 is configured to track, authorize, and monetize third-party access to the AI avatar using a rights management protocol. This module ensures that digital likenesses are deployed ethically, lawfully, and in accordance with pre-established terms. It includes a license verification engine that authenticates user or developer credentials and validates session permissions before granting access to the avatar system.

A smart contract layer within the module may be used to implement blockchain-backed terms of use, including access windows, fee schedules, and revenue distribution agreements. These smart contracts can enforce one-time payments, recurring subscriptions, or pay-per-interaction pricing, depending on the business model selected by the avatar owner or their estate. The system supports licensing options such as private family use, public media deployment, training services, or educational archives.

The module also features a dashboard interface for rights holders to monitor usage metrics, license expirations, financial earnings, and compliance reports. In the event of misuse or attempted unauthorized access, automated alerts and revocation protocols may be triggered. All transactions and access records are logged for auditability, dispute resolution, and regulatory compliance. This module plays a critical role in commercial, posthumous, or celebrity avatar applications.

The rendering engine 260 is configured to animate the AI avatar in real time using sentiment-driven gestures, facial expressions, and synchronized speech output. It serves as the visual output layer that transforms internal avatar logic into expressive on-screen behavior. This module includes a gesture animation engine that triggers body and facial animations in response to emotional or contextual cues.

The rendering engine includes a real-time compositor that overlays the avatar onto dynamic or static backgrounds, depending on the deployment platform. For mobile and desktop applications, it may use 2D compositing; for AR/VR, it may generate stereoscopic or spatial content. Lip movements, eyebrow lifts, head tilts, and other micro-expressions are rendered using viseme and emotion mapping pipelines connected to the speech synthesis and sentiment engines.

A performance optimizer dynamically adjusts resolution, frame rate, and rendering complexity based on device capabilities and bandwidth conditions. The rendering engine may stream live video, output animated files, or support holographic displays using volumetric rendering formats. Outputs may be encoded in real-time and transmitted directly to user-facing endpoints or archived for later playback. This module ensures the final user experience is expressive, emotionally congruent, and technically seamless.

In one embodiment, the system may be used for legacy preservation, allowing individuals to record their likeness, voice, and personality for the benefit of future generations. A user may upload life stories, personal writings, family photos, and video interviews into the data ingestion module. The resulting AI avatar can engage with family members interactively, answering questions and conveying stories in the voice and personality of the original individual. In this use case, privacy-first deployment is critical, and the system may be configured for local storage only, with end-to-end encryption applied to all data layers.

Another embodiment supports educational deployment, wherein a subject-matter expert or historical figure's likeness and knowledge are captured and deployed in virtual classrooms. Students can interact with the avatar through text or voice to ask questions, hear explanations, and review materials in an engaging, personalized format. The personality modeling engine may be configured to prioritize pedagogical tone and clarity of communication, and the licensing system may be integrated with academic portals. This embodiment benefits from the context memory engine, which allows the avatar to track student progress over time.

In a commercial entertainment context, the system may be used to generate celebrity avatars for brand partnerships, fan engagement, or content creation. A public figure may authorize the creation of an avatar that interacts with fans, provides pre-recorded or adaptive responses, and participates in livestream events. In this embodiment, the licensing and usage management system enables NFT-based monetization or revenue-sharing arrangements via smart contracts. Visual likenesses may be rendered at high resolution for AR/VR experiences or mobile apps, and multiple outfits or expression templates may be dynamically applied by the rendering engine.

The system may also be deployed in therapy and mental health applications, where the avatar of a trusted mentor, family member, or fictional character serves as a supportive companion. Here, the personality modeling engine may emphasize empathic response modeling, and the interaction module may integrate journaling features or guided dialogue prompts. The sentiment analysis unit can detect signs of distress or anxiety and adapt its behavior accordingly. This embodiment may restrict certain conversational topics for ethical compliance and include parental or clinical oversight features.

In enterprise settings, the system may be used to generate training avatars for employee onboarding, technical instruction, or compliance walkthroughs. A subject-matter expert within the company records demonstration videos and explains policies, which are processed to create a responsive AI assistant. The avatar can answer procedural questions, test comprehension, and offer tailored guidance based on the user's department or role. The licensing module may restrict usage to authorized enterprise logins, and updates can be pushed to the personality model as company policies evolve.

An alternative embodiment may allow posthumous content unlocking, wherein time-gated or milestone-triggered messages are stored and released via the interaction module.

For example, a parent may pre-record congratulatory or advisory messages to be revealed at a child's graduation or wedding. The licensing system enforces conditional release policies using blockchain smart contracts or timestamp-based rules. The avatar remains dormant until the triggering event occurs, at which point the rendering engine brings it to life with voice and gesture appropriate to the occasion.

Another embodiment enables multi-instance avatar deployment, where a single personality model and visual likeness are shared across multiple platforms with context awareness. For instance, one avatar instance may operate in a VR museum as a tour guide, while another instance answers questions via a mobile chatbot. The system allows each instance to maintain its own memory thread while drawing from a centralized personality model. This allows for consistent behavioral expression while adapting to distinct conversational environments and user bases.

In certain cases, the system may be tailored for low-bandwidth environments by disabling the rendering engine's real-time animation capabilities and relying instead on audio and static imagery. The voice and likeness synthesis unit can still provide engaging dialogue, while facial images and text-based captions provide sufficient visual cues. This embodiment is particularly suitable for educational deployments in rural or underserved regions where connectivity is limited. The licensing system in this mode may implement offline token validation or one-time key activation.

In another alternative embodiment, the data ingestion module may be augmented with live data feeds from wearable sensors or environmental inputs to update the avatar's behavior in real time. This can allow a user's real-world mood or location to influence the avatar's tone or context. For example, a business coach avatar might adjust its suggestions based on the user's heart rate or calendar events. This adds an adaptive, real-world layer to avatar engagement and bridges the gap between static data and dynamic personality reflection.

The system may also support collaborative avatar construction, where multiple stakeholders, such as family members, coworkers, or friends, contribute data to the same avatar. This approach allows a group to preserve the likeness and memory of a deceased loved one by combining shared memories, recordings, and writings. The personality modeling engine can weigh and normalize contributions to construct a consensus personality model. Versioning tools may allow different behavioral profiles for different contexts (e.g., formal, casual, familial).

In yet another embodiment, the system can be used to create fictional or composite avatars, where no single individual's data is dominant. For example, an educational institution may design an AI tutor that blends traits of multiple excellent instructors. The data ingestion module ingests anonymized data from these instructors, and the personality modeling engine synthesizes a composite teaching personality. The licensing system may manage collective rights attribution, while the rendering engine produces a unique but fictional visual representation.

Finally, the system may be integrated into interactive storytelling platforms, enabling users to engage with historically inspired or imaginary characters in narrative settings. These avatars can adapt their dialogue and emotional responses based on the user's decisions, using branching narrative paths. The personality modeling engine ensures consistent character logic and thematic coherence, while the rendering engine provides cinematic visuals. This embodiment supports entertainment, education, and gamification applications and allows for avatars to evolve their storylines across user interactions.

In this disclosure, the various embodiments are described with reference to the flowchart illustrations and/or block diagrams of methods, apparatus (systems), and computer program products.

Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A system for governing authorized creation, deployment, and use of an interactive artificial intelligence (AI) avatar of a real individual, the system comprising: one or more processors; and memory storing instructions that, when executed by the one or more processors, cause the system to implement:

a Licensing & Usage Management System implemented by the one or more processors and configured to operate as an authorization and enforcement layer that, prior to any avatar synthesis, interaction, or the deployment, performs an identity-linked consent evaluation to determine whether a requesting entity is authorized to access or deploy the interactive artificial intelligence (AI) avatar of the real individual, the Licensing & Usage Management System comprising:

a consent registry storing one or more authorization records associated with the real individual or a designated rights holder, each authorization record specifying at least a permitted usage scope, permitted requesting entities, and temporal or conditional access constraints;

a license verification engine implemented by the one or more processors and configured to verify a license key and authenticate an identity of the requesting entity, prior to enabling any downstream avatar synthesis, interaction, or rendering operation;

an audit log implemented by the one or more processors and configured to persistently record each authorization determination, including the identity of the requesting entity, an authorization outcome, a timestamp, and a permitted or denied operation within the permitted usage scope, the audit log being queryable by the real individual or the designated rights holder;

a Data Ingestion Module implemented by the one or more processors and configured to receive and process multimodal data comprising one or more of photos, videos, audio recordings, written content, and behavioral profiling data, the Data Ingestion Module being operable only upon a prior positive authorization determination by the Licensing & Usage Management System;

a Personality Modeling Engine implemented by the one or more processors and configured to generate a personality model of the real individual based on the multimodal data, the personality model comprising personality traits, conversational style, decision-making patterns, and emotional tendencies;

a Voice & Likeness Synthesis Unit implemented by the one or more processors and configured to synthesize a digital voice and visual likeness of the real individual using the personality model and the multimodal data, the Voice & Likeness Synthesis Unit being operable only upon the prior positive authorization determination by the Licensing & Usage Management System;

an Interaction Module implemented by the one or more processors and configured to enable user interaction with the interactive artificial intelligence (AI) avatar via one or more interfaces selected from the group consisting of text-based interfaces, voice-based interfaces, video-based interfaces, and augmented or virtual reality environments, wherein each interaction session is initiated only after the Licensing & Usage Management System validates session-level authorization; and a Rendering Engine implemented by the one or more processors and configured to animate the interactive artificial intelligence (AI) avatar in real time using sentiment-driven gestures, facial expressions, and synchronized speech output.

2. The system of claim 1, wherein the Data Ingestion Module further comprises preprocessing routines to normalize multimodal data for personality model training.

3. The system of claim 1, wherein the Personality Modeling Engine generates personality trait vectors based on psychological assessment frameworks including one or more Big Five personality dimensions or Myers-Briggs Type Indicators (MBTI).

4. The system of claim 1, wherein the Personality Modeling Engine applies trait injection algorithms to modify AI responses based on one or more personality trait vectors.

5. The system of claim 1, wherein the Voice & Likeness Synthesis Unit employs neural network-based voice cloning using the real individual's audio recordings.

6. The system of claim 1, wherein the Voice & Likeness Synthesis Unit generates a photorealistic avatar using green screen video footage and three-dimensional modeling.

7. The system of claim 1, wherein the Interaction Module includes a context memory engine configured to retrieve prior interactions for continuity in conversation.

8. The system of claim 1, wherein the Interaction Module includes a sentiment analysis engine that adjusts responses based on an emotional tone of a user.

9. The system of claim 1, wherein the Licensing & Usage Management System further comprises a blockchain-based smart contract layer configured to cryptographically enforce the authorization records stored in the consent registry, including automatic execution of compensation disbursement, license duration enforcement, and revocation upon detection of unauthorized access.

10. The system of claim 1, wherein the Licensing & Usage Management System supports monetization models selected from the group consisting of per-session access, subscription access, and non-fungible token-based (NFT) licensing, wherein each monetization model is conditioned on a prior positive authorization determination from the license verification engine and each transaction is recorded in the audit log.

11. The system of claim 1, wherein the Rendering Engine synchronizes lip movement of the AI avatar to the synthesized speech output.

12. The system of claim 1, wherein the Rendering Engine triggers avatar animations based on real-time analysis of user sentiment and conversational context.

13. A method for creating and deploying an interactive artificial intelligence (AI) avatar of a real individual, the method comprising the steps of:

performing, by a Licensing & Usage Management System, an identity-linked consent evaluation prior to any avatar synthesis, interaction, or deployment, comprising: retrieving one or more authorization records from a consent registry associated with the real individual or a designated rights holder;

verifying a license key and authenticating an identity of a requesting entity against the authorization records to produce an authorization determination, including enforcing time-based access control constraints;

persistently recording the authorization determination in an audit log, an audit log entry comprising the identity of the requesting entity, an authorization outcome, a timestamp, and a permitted or denied operation within a permitted usage scope;

receiving, by a Data Ingestion Module, multimodal data associated with the real individual comprising photos, videos, audio recordings, written content, and behavioral profiling responses, only upon a prior positive authorization determination;

generating, by a Personality Modeling Engine, a personality model from the multimodal data, the personality model including quantified personality trait vectors;

synthesizing, by a Voice & Likeness Synthesis Unit, a voice model and a visual avatar representing the real individual based on the personality model, only upon the prior positive authorization determination;

enabling, by an Interaction Module, natural language interactions between users and the interactive artificial intelligence (AI) avatar via one or more supported platforms, wherein each interaction session is validated against the consent registry prior to initiation;

enforcing, by the Licensing & Usage Management System, ongoing compliance with the authorization records during each interaction session, including monitoring for usage scope violations and triggering revocation upon detection of unauthorized access; and animating, by a Rendering Engine, the interactive artificial intelligence (AI) avatar using visual gestures, facial expressions, and synchronized voice responses based on sentiment analysis of an interaction.

14. The method of claim 13, further comprising the step of generating time- or milestone-triggered messages using the Interaction Module and storing them for conditional release, wherein the conditional release is governed by the authorization records in the consent registry.

15. The method of claim 13, wherein the Voice & Likeness Synthesis Unit uses three-dimensional photogrammetry to reconstruct the facial likeness of the real individual.

16. The method of claim 13, wherein the audit log is queryable through a rights holder dashboard that displays each authorization determination, session-level usage statistics, and enforcement outcomes including any revocations or access denials.

17. The method of claim 13, further comprising deploying an interactive artificial intelligence (AI) avatar system locally or in a cloud environment based on a privacy configuration.

18. A non-transitory computer-readable medium storing instructions that, when executed by one or more processors, cause an interactive artificial intelligence (AI) avatar system to:

perform an identity-linked consent evaluation via a Licensing & Usage Management System prior to any avatar synthesis, interaction, or deployment, including verifying a license key, authenticating an identity of a requesting entity against a consent registry storing authorization records associated with a real individual or a designated rights holder, enforcing time-based access control constraints, and persistently recording each authorization determination, including the identity of the requesting entity, an authorization outcome, a timestamp, and a permitted or denied operation within a permitted usage scope, in a queryable audit log;

receive and normalize multimodal data via a Data Ingestion Module, only upon a prior positive authorization determination;

generate a behavioral personality model via a Personality Modeling Engine using at least one artificial intelligence algorithm;

synthesize a voice and likeness for the interactive artificial intelligence (AI) avatar via a Voice & Likeness Synthesis Unit using voice cloning and visual modeling, only upon the prior positive authorization determination;

present an interactive experience via an Interaction Module through one or more of text, audio, video, or virtual reality channels, wherein each interaction session is validated against the consent registry prior to initiation;

enforce ongoing compliance with the authorization records during each interaction session via the Licensing & Usage Management System, including monitoring for usage scope violations; and render the interactive artificial intelligence (AI) avatar in real time via a Rendering Engine with adaptive visual and auditory outputs.

19. The non-transitory computer-readable medium of claim 18, wherein the instructions cause the Personality Modeling Engine to update the behavioral personality model continuously based on new user interactions, subject to ongoing positive authorization determinations.

20. The non-transitory computer-readable medium of claim 18, wherein the instructions cause the Rendering Engine to output visual content in formats compatible with augmented reality, virtual reality, and holographic displays.

* * * * *